(12) United States Patent
Ogden

(10) Patent No.: X2037
(45) Date of Patent: Dec. 31, 1813

(54) STEAM ENGINE,APPLICATION OF STEAM

(76) Inventor: Francis B. Ogden

United States Patent

Patent No.: X2037

Francis B. Ogden
Letters Patent

United States of America }
State of New York. } ss.

( Seal ) By this Public Instrument, Be it known to all whom the same doth or may concern, That I, William Van Hook, a Public Notary in and for the State of New York, by Letters Patent under the Great Seal of the said State, duly Commissioned and sworn, and in and by the said Letters Patent invested "With full Power and Authority to attest deeds Wills, Testaments, Codicils, Agreements, and other instruments in writing, and to administer any Oath or Oaths to any Person or Persons," Do Hereby Certify, That on the day of the date hereof personally came and appeared before me the said notary Francis B. Ogden known to me to be the same person named and described in the Power of Attorney hereunto annexed and in my presence sign seal execute and acknowledge the same as [illegible] his act and deed for the uses and purposes therein mentioned. In testimony whereof, I the said Notary have subscribed these presents, and I have hereunto affixed my Seal of Office, the Twenty fifth day of July, in the year One thousand eight hundred and fifteen and of the Independence the thirty ninth Wm Van Hook Not Pub.

Whereas Francis B. Ogden of the State of New Jersey in the United States of America hath invented or discovered a new and useful improvement in the Steam Engine and obtained a Patent therefor from the Patent Office of the United States in the words following to wit_

The United States of America

To all to whom these letters patent shall come.
Whereas Francis B. Ogden a citizen of the United States
hath alleged that he has invented a new and useful
improvement in Steam Engines and in applying Steam,
which improvement he states has not been known or used
before his application, hath made oath that he does
verily believe that he is the true inventor or discoverer
of the said improvement hath paid into the Treasury of
the United States the sum of thirty dollars delivered
a receipt for the same, and presented a petition to the
Secretary of State signifying a desire of obtaining an ex-
clusive property in the said improvement and praying
that a patent may be granted for that purpose.
These are therefore to grant according to law to the said
Francis B. Ogden his heirs administrators or assigns, for
the term of fourteen years from the thirty first day of
December One thousand eight hundred & thirteen the full
and exclusive right and liberty of making, construc-
ting using, and vending to others to be used, the said im-
provement, a description whereof is given in the words
of the said Francis B. Ogden himself in the schedule
hereto annexed, and is made part of these presents.
In testimony whereof I have caused these Letters to be
made Patent and the Seal of the United States to be there-
unto affixed. Given under my hand at the City of
Washington this thirty first day of December in the year
of our Lord, One thousand eight hundred and thirteen
and of the Independence of the United States of America
the thirty eighth.

(Signed) James Madison

By the President

City of Washington to wit: Jas. Monroe

I do hereby certify that the Secretary of State foregoing Letters patent were delivered to me on the thirty first
day of December in the year of our Lord One thousand eight
hundred and thirteen to be examined that I have examined
the same and find them conformable to law, and I do here-
by return them to the Secretary of State within fifteen days of
the date aforesaid, to wit on this thirty first day of december
in the year aforesaid (Signed) Wm. Pinkney Atty General of the United States The Schedule referred to in these Letters Patent and making
part of the same, containing a description in the words
of the said Francis B. Ogden himself of his improvement
in Steam Engines and his method of applying Steam.
This improvement is predicated on the fact discov-
ered and demonstrated by Mr Watt, that the elasticity
of Steam being proportionate to its density, its expansion
on being stopt off at 1/4 1/3 or 1/2 the capacity of the cyl-
inder will produce a power in a much greater ratio
than 1/4 1/3 or 1/2 of the whole, vide Encyclopedia, 1st American
edition, Art. Steam plate 478 fig 10. I propose working my
Steam of whatever density in two cylinders or other ves-
sels, to be stopt off at any point from 1/8 to 1/2 — If at
one half, the instant one cylinder is half filled its steam
valve is closed and that of the other is opened, or its pis-
tons arriving at the end of the stroke, that of the other
will have performed half a one, its steam valve will
then be closed and that of the first again opened
as well as its opposite condensing valve, thus the motion
will be regularly continued each cylinder alternately half
filled with steam, and as by Mr Watts demonstration,
stopping at one half gives a gain of 70 per cent allowing
the power of Steam to be equal to 100, 170 will be pro-
duced in the same time that 100 would be in a single cylinder — I do not confine myself to any particular mode in the application of my power, either the working beam, Guides, or any other method now in practice may be adapted with equal facility.

I further claim as my invention the application of the power of the two pistons in such a manner that they shall act simultaneously on the same axis at right angles with each other, from whence it is plain that when one is at its minimum the other being at its maximum will carry it past the point, and that they will mutually tend to equalize the motion thereby doing away the necessity of balance wheels Witnesses
John Reynolds
[illegible] Hunter (Signed) Fra^s B. Ogden Now Know Ye that the said Francis B. Ogden hath made named authorised constituted and appointed, and by these presents doth make, name author-ize constitute and appoint Peter V Ogden of the State of New Jersey in the United States of America, his true and lawful attorney for him the said Francis, and to his use to take out a Patent within the Kingdoms of England Scotland and Ireland or either of them, for the said im-provement and to vend and sell any rights to any person whatever, and generally to do perform and execute all and every such lawful and reasonable act, deal, matter and thing whatsoever with respect to the matter aforesaid as fully and effectually to all intents and purposes as the said Francis might or could do himself if personally present. And the said Francis B. Ogden doth hereby ratify and promise and agree to ratify allow and confirm, all and whatsoever his said attorney shall lawfully do or cause to be done in the premises by virtue of these presents. In witness whereof the said [illegible] hath
hereunto set his hand and seal this seventeenth day
of July in the year of our Lord one thousand
eight hundred and fifteen
Sealed and delivered
in the presence of
Wm. Van Hook
Not Pub.

Fras. B. Ogden (L.S.)

To all to whom these Presents shall come.
I Thomas William Moore Esquire His Britannic Majesty's
Pro Consul for the Eastern States of America do hereby
certify Wm. Van Hook before whom the within power
of Attorney was witnessed is a Notary Public in & for
the City & County of New York duly commissioned and
appointed.

In faith & testimony whereof I the said Pro
Consul have hereunto set my hand and affixed
my Seal at the City of New York, this twenty
fifth day of July in the year of our Lord One
thousand Eight Hundred & fifteen (L.S.)

Thomas William Moore
Pro Consul

[illegible] )

Exd
[illegible]

( Received & Recorded anew March 24. 1845. )

DRAFTSMAN'S DIVISION.

*All communications should be addressed to "The Commissioner of Patents, Washington, D. C."*

2—328 *a.*

*DEPARTMENT OF THE INTERIOR,*

United States Patent Office.

*Washington, D. C.,* ............, *189*...

*SIR:*

*The printed* copies *of Patent No.* F B Ogden Dec 31 1813 are *exhausted.*

*As soon as reprinted a copy will be mailed you to complete your order.*

*By direction of the Commissioner:*

*Very respectfully,*

*Chief Clerk.*

3143b6-97-5m